L. R. SMITH.
DRIVEN SHAFT GOVERNOR.
APPLICATION FILED MAR. 15, 1909.

1,030,934.

Patented July 2, 1912.

WITNESSES:
W. M. Gentle,
O. M. McLaughlin

INVENTOR.
Leon R. Smith.
BY
V. H. Lockwood.
ATTORNEY.

UNITED STATES PATENT OFFICE.

LEON R. SMITH, OF INDIANAPOLIS, INDIANA, ASSIGNOR TO THE HENRICKS NOVELTY COMPANY, OF INDIANAPOLIS, INDIANA, A CORPORATION.

DRIVEN-SHAFT GOVERNOR.

1,030,934.  Specification of Letters Patent.  Patented July 2, 1912.

Application filed March 15, 1909. Serial No. 483,504.

*To all whom it may concern:*

Be it known that I, LEON R. SMITH, of Indianapolis, county of Marion, and State of Indiana, have invented a certain new and useful Driven-Shaft Governor; and I do hereby declare that the following is a full, clear, and exact description thereof, reference being had to the accompanying drawings, in which like letters refer to like parts.

The object of this invention is to provide an improved governor controlled friction clutch shaft driving mechanism.

The invention has been applied in magnetos, especially those driven by belts, cords and the like, but the invention is not necessarily limited to such use.

One feature of the invention consists in the means and manner of mounting on the driven shaft the pulley for driving the same, said pulley being independently revoluble, and the governor controlled mechanism for transmitting power from the pulley to the shaft. The pulley has shrunk or otherwise rigidly secured in it a hard metal ring provided with a bearing ball race. A sleeve is adjustably secured on the shaft so it can be moved laterally for adjustment and a corresponding hard metal ring is shrunk or secured on said sleeve and provided with a ball race. There is a radial inwardly extending flange from the body of the pulley and that will bear against the side of the bearing ring that is secured to the sleeve on the shaft. This flange is on the side next to the friction disk through which power is transmitted from the pulley to the shaft.

Another feature consists in mounting on the protruding end of the shaft a fixed centrifugal governor that controls a laterally slidable friction disk and mounted on said shaft between said governor and the bearing of the shaft is the driving pulley so as to be rotated independent of the shaft and in position to be engaged by the friction disk, whereby power is transmitted from the pulley to the shaft.

The nature of my invention will be understood from the accompanying drawings and the following description and claims.

Figure 1:
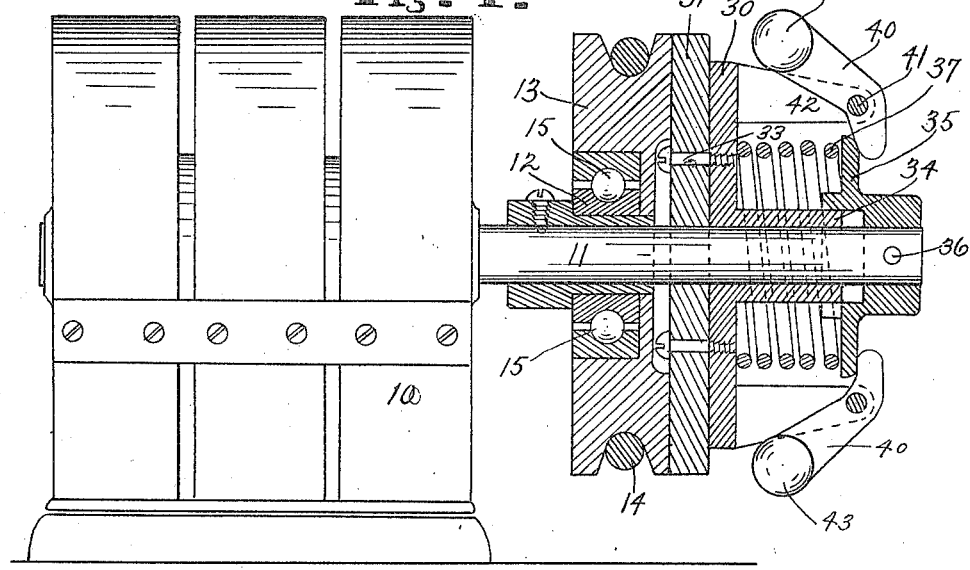
Figure 2:
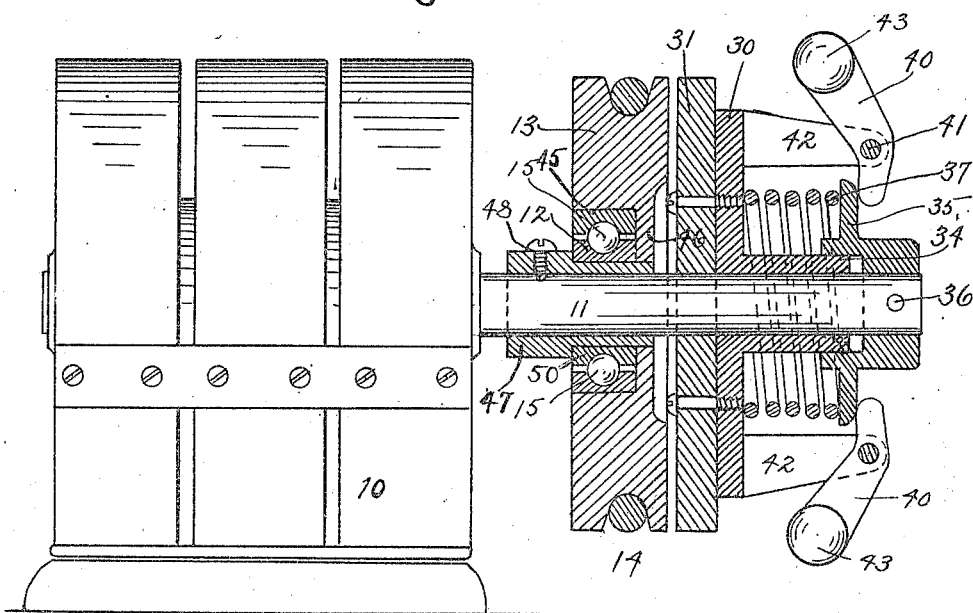

In the drawings Figure 1 is a side elevation of a magneto with the driving and regulating portion in central vertical section longitudinally of the shaft and showing the parts in normal or idle position. Fig. 2 is the same with the position of the parts at high speed.

In detail there is shown herein a magneto 10 having an armature shaft or inductor 11 on which a bearing 12 is secured and the driving pulley 13 is mounted on said bearing so as to rotate independently of the shaft 11. It is driven by a cord or belt 14 from a suitable driving means, not shown. The balls 15 prevent the lateral escape of the pulley. A friction disk composed of the metal plate 30 with a facing of leather 31 secured thereon by screws 33 is slidable longitudinally of the shaft 11. The disk 30 has a sleeve 34 extending in a direction away from the pulley 13 and having bearing on the shaft so as to maintain the friction disk at a right angle to the shaft. A stationary plate 35 is secured on the end of the shaft 11 by the pin 36. A spring 37 is coiled around the sleeve 34 and between the plate 35 and the disk 30, so as to tend at all times to force the friction disk against the pulley, and thus cause the transmission of power from the pulley to the shaft.

When the speed grows too great the pressure of the disk against the pulling is reduced by a centrifugal governor. This governor mechanism consists of weighted levers 40 fulcrumed between their ends by pins 41 to arms 42 extending from the disk 30 parallel with the shaft. The outer ends of the levers are weighted by balls 43 and the inner ends are in position to engage the plate 35. When the speed is great the balls 43 fly outwardly under the influence of centrifugal force and by reason of the bearing of the inner ends of the levers 40 against the plate 35, such action of the levers 40 draws the friction disk in a direction away from the pulley. This diminishes the speed of the armature shaft and when it has been reduced below the desired speed, the governor weights cease to act as described and the spring increases the engagement of the disk and pulley. In this construction the governor mechanism is on the outer end of the shaft while the pulley is near the bearing of the shaft in the magneto, so that the pull of the belt or cord will have little disturbing or straining effect on the shaft. Heretofore, the pulley has usually been on the outer end of the shaft remote from its bearing and with a governor mechanism between the pulley and the bearing of the shaft.

The pulley 13 has shrunk in it or otherwise secured to its inner periphery a hard metal bearing ring 45 and an inwardly extending radial flange 46 at the side thereof next to the friction disk 31. This flange extends to a sleeve 47 slidable on the shaft 11 and adjustably secured by the screw 48 outside of the pulley and its bearings. A hard metal bearing ring 50 is shrunk or otherwise secured on said sleeve 48 and has in it a ball race for balls 15. The flange 46 engages the side of the ring 50, which is near to the disk 31. With this means for mounting, the pulley 13 is easily adjusted with reference to the friction disk 31 and will be extremely strong and held in place although mounted on ball bearings. If the side pressure of the disk 31 against pulley 13 is too great for the balls, it will be taken up by the engagement of the inner end 50 to the flange 46. The pulley can be set up to the friction disk 31 so as to materially increase or diminish the general speed of the device, as desired.

What I claim as my invention and desire to secure by Letters Patent, is:

The combination with a driven shaft, of a driving pulley surrounding the shaft and with its central portion provided near one side with an inwardly extending flange and with a recess beside said flange, a ball bearing mounted in said recess, a stop block secured to said shaft to prevent the ball bearing from moving longitudinally of the shaft in one direction, a clutch disk on the other side of the pulley and slidable on the shaft, a plate fixed to the shaft, a spring between said plate and clutch disk tending to push the clutch disk against the pulley and the pulley and ball bearing against said stop block, and a centrifugal governor controlled means on the clutch disk and fixed plate which under speed tends to draw the clutch disk toward the plate and reduce or terminate its engagement with the pulley.

In witness whereof, I have hereunto affixed my signature in the presence of the witnesses herein named.

LEON R. SMITH.

Witnesses:
G. H. BOINK,
O. M. McLAUGHLIN.